US008805417B2

(12) United States Patent
Angiolillo

(10) Patent No.: US 8,805,417 B2
(45) Date of Patent: Aug. 12, 2014

(54) DYNAMIC CONTACT LIST DISPLAY

(75) Inventor: Joel S. Angiolillo, Weston, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 399 days.

(21) Appl. No.: 12/494,821

(22) Filed: Jun. 30, 2009

(65) Prior Publication Data
US 2010/0330972 A1 Dec. 30, 2010

(51) Int. Cl.
H04W 24/00 (2009.01)
H04M 1/00 (2006.01)
H04B 1/38 (2006.01)

(52) U.S. Cl.
USPC ........................................ 455/456.3; 455/566

(58) Field of Classification Search
None
See application file for complete search history.

(56) References Cited

U.S. PATENT DOCUMENTS

| 7,133,859 | B1* | 11/2006 | Wong ................................ 1/1 |
| 2006/0084478 | A1* | 4/2006 | Erlichmen ................. 455/566 |
| 2008/0133580 | A1* | 6/2008 | Wanless et al. ............... 707/102 |
| 2008/0207271 | A1* | 8/2008 | Krutik et al. .................. 455/566 |
| 2009/0170532 | A1* | 7/2009 | Lee et al. ..................... 455/456.3 |
| 2009/0191898 | A1* | 7/2009 | Lewis et al. ................. 455/456.3 |
| 2010/0095221 | A1* | 4/2010 | Doppler et al. ............... 715/747 |
| 2010/0161369 | A1* | 6/2010 | Farrell et al. ..................... 705/8 |

* cited by examiner

Primary Examiner — Dwayne Bost
Assistant Examiner — Christopher Kohlman

(57) ABSTRACT

A dynamic contact list for a mobile device presents address book contacts in varying arrangements based on external factors. The mobile device may receive a request to display a contact list and may retrieve a sort procedure for the contact list. The sort procedure may be based on a user's prior selections from a group of contact sort rules. The mobile device may retrieve a list of contact identifiers and other information associated with each contact identifier that is applicable to the sort procedure. The mobile device may then apply the sort procedure to the list of contact identifiers and to the information associated with each contact identifier so as to displaying a sorted list of contact identifiers based on the applied sort procedure.

21 Claims, 15 Drawing Sheets

DYNAMIC CONTACT LIST DISPLAY

BACKGROUND

Mobile devices (e.g., cell phones, personal digital assistants (PDAs), etc.) are being configured to provide users with an increasing variety of communication options that may utilize stored contacts. For example, users may store on a mobile device contact lists that represent a variety of contacts and a variety of communication options for each contact. Contact lists are typically presented in a static format that may require a user to search through multiple screens or identify one or more letters for a particular contact before the desired contact is presented to the user.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a dynamic contact list for display on a mobile device. The dynamic contact list may present address book contacts, the order of which can vary based on factors such as the location of a user, the location of a device associated with a contact, the time of day, scheduled events, user activities, and communication patterns. A user may select one or more pre-defined sort rules that the mobile device may use to determine a sort procedure for the dynamic contact list. The mobile device may apply the sort procedure to current data at the time of presenting the dynamic contact list.

As used herein, the terms "user" and "contact" are intended to be broadly interpreted to include a communication device or a user of a mobile communication device.

Figure 1:
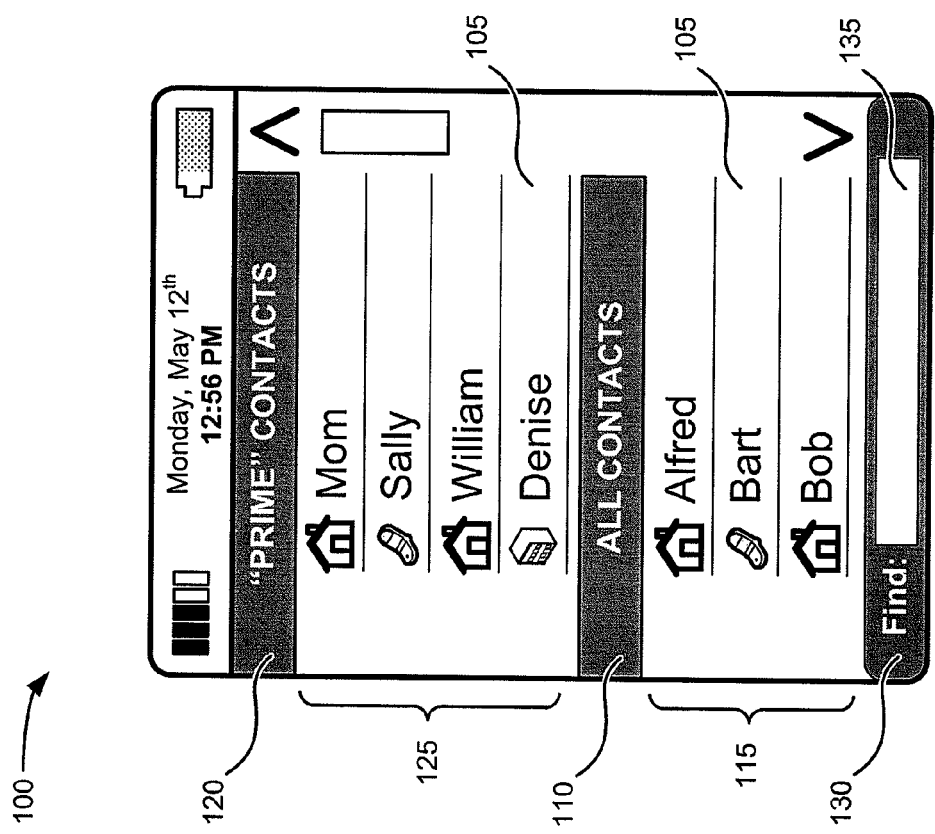
FIG. 1 depicts a diagram illustrating an exemplary implementation of concepts described herein.

FIG. 1 provides a diagram illustrating an exemplary implementation of a dynamic contact list 100. Dynamic contact list 100 may include an all contacts section 110 that includes a list 115 of particular contact identifiers 105, a prime contacts section 120 that includes another list 125 of particular contact identifiers 105, and a search section 130.

Each of all contacts section 110, prime contacts section 120, and search section 130 may be displayed in one or more windows on a display. A "window," as used herein, is intended to be broadly interpreted to include any display mechanism (e.g., a window, a menu, etc.) capable of being displayed by a display. For example, a window may include an enclosed area on a display screen that may display information and/or may permit execution of an application. The number of windows provided by a display, the types of windows, the types of information provided in windows, the arrangement of windows on the display, etc. may be configured by a user of a mobile device containing the display.

Referring to FIG. 1, contact identifiers 105 may include, for example, a person's name, a picture related to the contact, a location indicator associated with the contact (e.g., home, office, mobile, etc.), and/or other information. Each contact identifier 105 may provide a link to contact information (e.g., addresses, contact numbers, group associations, and the like) associated with a respective contact. Information for each contact identifier 105 may be stored and retrieved from a memory within a user device or from a contact profile available, for example, from a service provider. In one implementation, each contact identifier 105 may also provide a link to automatically dial a contact number associated with the particular contact identifier 105.

All contacts section 110 may include list 115 of contact identifiers 105 for all contacts that may be available (e.g., to be retrieved from a stored memory location) to a user device. List 115 may be displayed in a static manner, such as an alphabetical listing. In an exemplary implementation, only a portion of list 115 of all contacts section 110 may be displayed at a particular time and a user may scroll or search to view additional contact identifiers 105 in list 115. In another implementation, all contacts section 110 may use contact information adapted from another peripheral application running on the same device, such as images, location information, and/or presence information from an instant messaging (IM) application. Generally, "presence" may be considered a status of the nature of activity of a user (e.g., a device used by a person), such as "available," "online and busy," "offline," etc. Presence data may be gathered from a variety of sources including, for example, current activity by a user, schedule information (e.g., calendar or task list), specific indications from a user, a separate presence and availability management (PAM) system, and/or other sources.

Prime contacts list section 120 may include a list 125 of particular contact identifiers 105 for a subset of all contacts in that may be available in a user device (e.g., a subset of list 115). List 125 may include a unique subset of contact identifiers 105 based on one or more rules and/or conditions. For example, as described further herein, list 125 may include a location-based set of contact identifiers 105, a time-based set of contact identifiers 105, or a user-history-based contact identifier 105. In one implementation, list 125 of contact identifiers 105 may change dynamically as conditions change. In another implementation, list 125 of contact identifiers 105 may be calculated each time contact list 100 is presented (e.g., shown on a display). In an exemplary implementation, only a portion of list 125 of prime contacts section 120 may be displayed at a particular time, such that a user may scroll within prime contacts section 120 to view additional contact identifiers 105 in list 115.

Search section 130 may include a user interface (e.g., a search window 135) that allows input of search terms to further limit the display of list 115 and/or list 125. For example, a user may input into search window 135 and letter or character sequence so that list 115 and/or list 125 may be limited to contact identifiers 105 that begin with the entered letter or character sequence.

In an exemplary implementation, dynamic contact list 100 may assemble information retrieved from a list of contacts (e.g., stored locally on a user device) and apply a procedure to dynamically sort and/or present list 125 of contact identifiers 105 based on the set of rules. The procedure may include a variety of criteria that may result in different presentations of list 125 within prime contacts section 120 depending on user activities and/or environments of an associated user device. For example, as described further herein, dynamic contact list 100 may apply location-based rules, time-based rules, rules based on recent contact activity, rules based on particular user activities, rules based on scheduled events, etc. As described further herein, the sort procedure for dynamic contact list 100 may be defined by the user based on pre-defined rules, provided as a default setting in a user device, and/or retrieved from a network server.

Although FIG. 1 shows exemplary sections of dynamic contact list 100, in other implementations, dynamic contact list 100 may contain fewer, different, differently arranged, or additional information than depicted in FIG. 1. For example, dynamic contact list 100 may include a different number and/or arrangement of sections. Also, dynamic contact list 100 may include a different number and/or arrangement of items within each section (e.g., within all contacts section 110 and/or prime contacts section 120).

Figure 2:
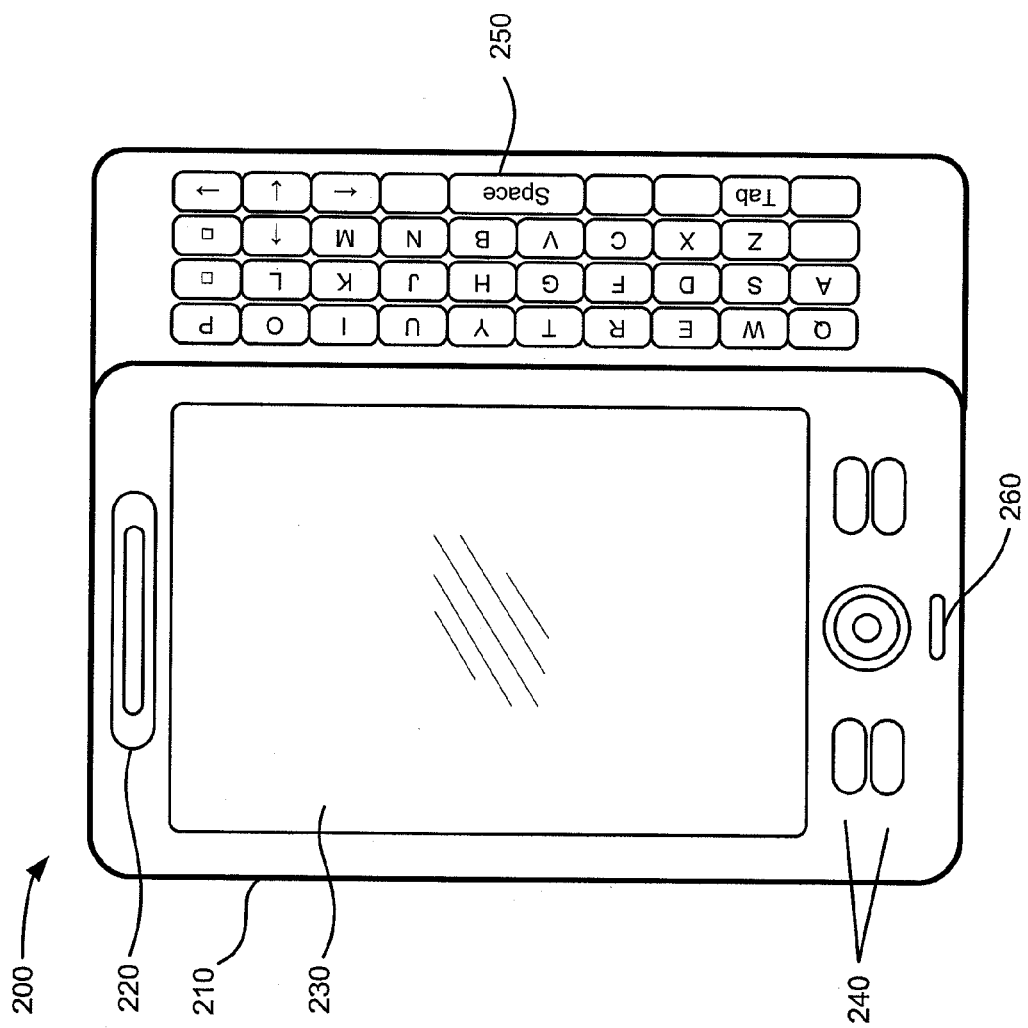
FIG. 2 depicts a diagram of an exemplary device in which systems and/or methods described herein may be implemented.

FIG. 2 is a diagram of an exemplary user device 200 (referred to herein as "device 200") in which systems and/or methods described herein may be implemented. Device 200 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a personal gaming system, a global positioning system (GPS) unit, or other types of computation or communication devices (e.g., that can receive and/or generate communications), a thread or process running on one of these devices, and/or an object executed by on of these devices.

As illustrated in FIG. 2, device 200 may include a housing 210, a speaker 220, a display 230, control buttons 240, a keypad 250, and/or a microphone 260. Housing 210 may protect the components of device 200 from outside elements. For example, housing 210 may be formed from plastic, metal, or a composite, and may be configured to support speaker 220, display 230, control buttons 240, keypad 250 and/or microphone 260.

Speaker 220 may provide audible information to a user of device 200. Speaker 220 may be located in an upper portion of device 200, and may function as an ear piece when a user is engaged in a communication session using device 200. Speaker 220 may also function as an output device for music and/or audio information associated with games and/or video images played on device 200.

Display 230 may provide visual information to the user. For example, display 230 may display text input into device 100, text, images, video, and/or graphics received from another device, and/or information regarding incoming or outgoing calls or text messages, emails, media, games, phone books, address books, the current time, etc. Display 230 may include a liquid crystal display (LCD), such as a thin film transistor (TFT) LCD, etc.

In one implementation, display 230 may include a touch screen display that may be configured to receive a user input when the user touches (or comes in close proximity to) display 230. For example, the user may provide an input to display 230 directly, such as via the user's finger, or via other devices, such as a stylus. User inputs received via display 230 may be processed by components and/or devices operating in device 200. The touch-screen-enabled display 230 may permit the user to interact with device 200 in order to cause device 200 to perform one or more operations. Exemplary technologies to implement a touch screen on display 230 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 230 to be used as an input device. The touch-screen-enabled display 230 may also identify movement of a body part or a pointing device as it moves on or near the surface of the touch-screen-enabled display 230.

Control buttons 240 may permit the user to interact with device 200 to cause device 200 to perform one or more operations. For example, control buttons 240 may be used to cause device 200 to transmit information or to display a contact list.

Keypad 250 may include a standard telephone keypad, a QWERTY-like layout (as shown) with a traditional configuration of typewriter or computer keyboard keys, or another keypad layout. In one implementation, keypad 250 may be moveably secured to housing 210 to allow keypad 250 to be concealed when not in use. Keypad 250 may be an optional component.

Microphone 260 may receive audible information from the user. For example, microphone 260 may receive audio signals from the user and may output electrical signals corresponding to the received audio signals.

Although FIG. 2 shows exemplary components of device 200, in other implementations, device 200 may contain fewer, different, differently arranged, or additional components than depicted in FIG. 2. In still other implementations, a component of device 200 may perform one or more tasks described as being performed by another component of user device 200.

Figure 3:
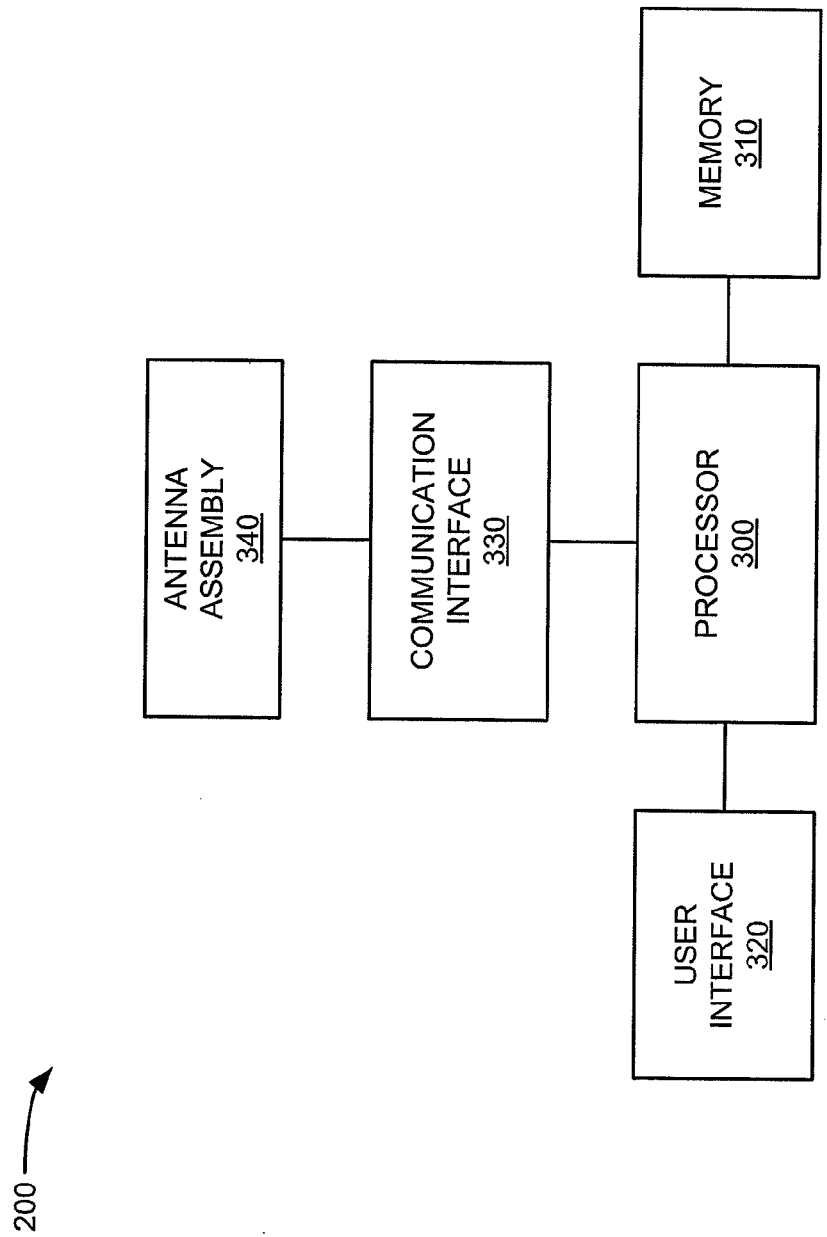
FIG. 3 depicts a diagram of exemplary components of the device illustrated in FIG. 2.

FIG. 3 is a diagram of exemplary components of device 200. As illustrated, device 200 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 200 and its components. In one implementation, processor 300 may control operation of components of device 200 in a manner described herein.

Memory 310 may include a random access memory (RAM), a read-only memory (ROM), and/or another type of memory to store data and instructions that may be used by processor 300. In one implementation, memory 310 may store contact-related data and/or data used to display a graphical user interface, such as dynamic contact list 100 on display 230.

User interface 320 may include mechanisms for inputting information to device 200 and/or for outputting information from device 200. Examples of input and output mechanisms might include buttons (e.g., control buttons 240, keys of keypad 250, a joystick, etc.); a speaker (e.g., speaker 220) to receive electrical signals and output audio signals; a microphone (e.g., microphone 260) to receive audio signals and output electrical signals; a display (e.g., display 230) to receive touch input and/or to output visual information (e.g., a contact list); a vibrator to cause device 200 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, a component of device 200 may perform one or more other tasks described as being performed by another component of device 200.

Figure 4:
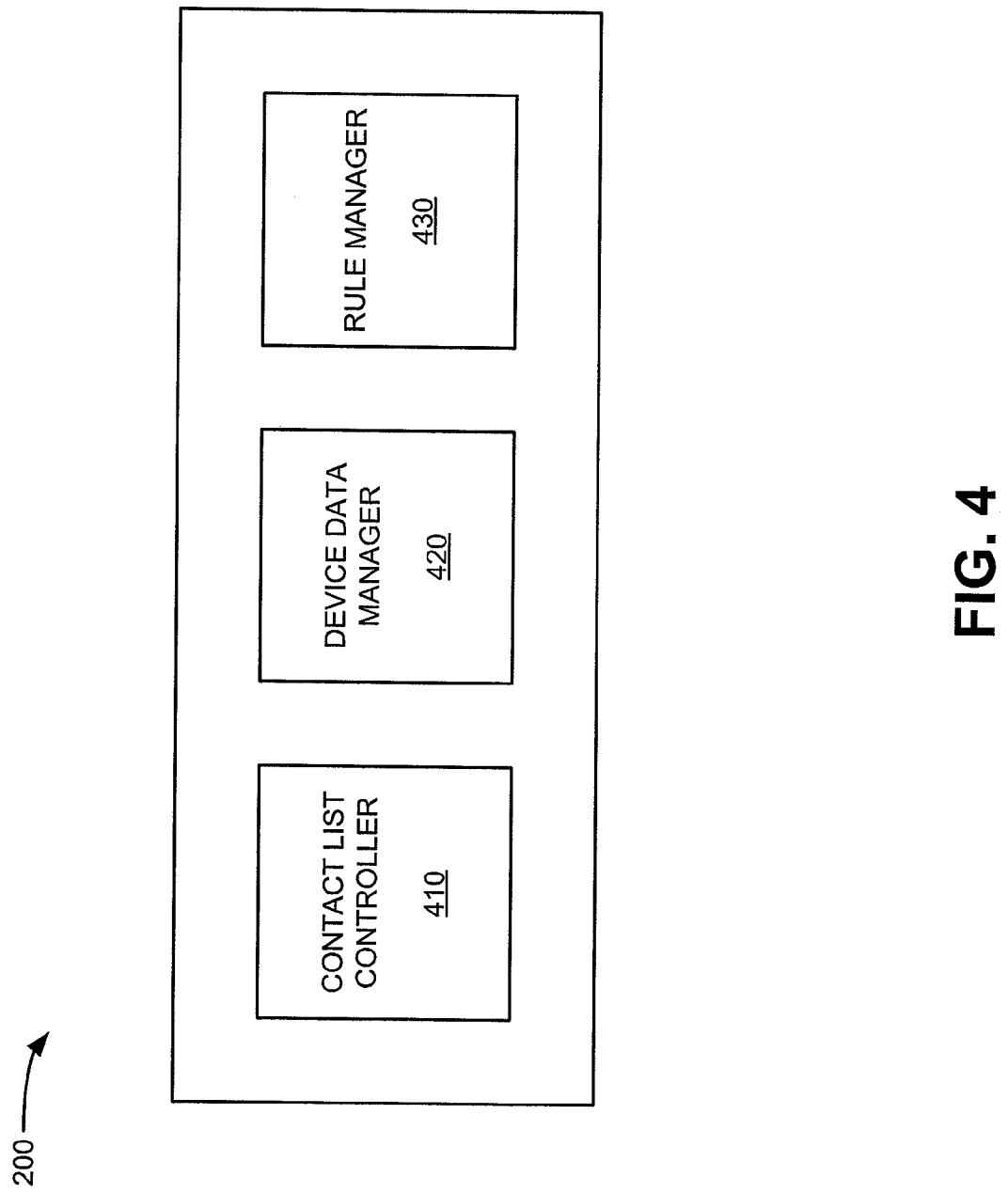
FIG. 4 depicts a diagram of exemplary functional components of the device illustrated in FIG. 2.

FIG. 4 provides a diagram of exemplary functional components of device 200. The functional components may be implemented by, for example, processor 300 in conjunction with memory 310. As shown in FIG. 4, device 200 may include a contact list controller 410, a device data manager 420, and a rule manager 430. Device 200 may also include other peripheral applications (not shown) associated with one or more items to be sent/received using gesture-based item delivery. Peripheral applications may include, for example, a file manager application, a telephone application, a text-messaging application, an email application, an instant messaging (IM) application, a calendar application, a multimedia messaging service (MMS) application, a short message service (SMS) application, an image viewing application, a camera application, an organizer, a video player, an audio application, a GPS application, a game application, etc.

Contact list controller 410 may control operations to display dynamic contact list 100. Contact list controller 120 may retrieve and apply information from device data manager 420 and rule manager 430 to determine contact identifiers to display in, for example, list 115 of all contact section 110 and/or list 125 of prime contacts section 120. Contact list controller 410 may also modify the display of contact list 100 based on user input, such as search terms provided by a user in search section 130.

Device data manager 420 may request, retrieve, store and/or analyze information to facilitate implementation of dynamic contact list 100. Information to facilitate implementation of dynamic contact list 100 may include static contact information, geographic position data, communication pattern data, scheduled events (e.g., calendar/task list items), user activities, and the like.

Static contact information may include a list of contact identifiers and contact information associated with particular contact identifiers (e.g., contact identifiers 105), such as addresses (e.g., email, instant message, postal addresses, etc.), contact numbers (e.g., phone numbers for one or more device associated with a contact), group associations, user notes, etc. Static contact information may be entered by a user and stored in a memory (e.g., memory 310) of device 200. In another implementation, static contact information may be downloaded from another device.

Geographic position data may include a current position of device 200 and/or positions of other devices associated with particular contacts. For example, in one implementation, device data manager 420 may communicate with a GPS component of device 200 to obtain geographic position information for device 200. In another implementation, device data manager 420 may also request location information for devices associated with other contacts. Device data manager 420 may also store (e.g., in memory 310) information for fixed-location devices associated with other contacts.

Communication pattern data may include historical data regarding communication activities of device 200. Communication pattern data may receive data from other peripheral applications, such as email, text messaging, and calling applications. For example, communications pattern data may include records of most frequently used contacts from a variety of communication applications (e.g., email, phone, text, etc.) or from a particular communication. Communications pattern data may also include records of contacts from which communications were recently received, records of contacts to which communications were recently sent, and the like.

Scheduled event data may include data from a peripheral application, such as a calendar or organizer program. Scheduled event data may include, for example, calendar entries or task items entered by the user and/or downloaded from an eternal source. In one implementation, scheduled event data may include one or more contacts associated with a scheduled event. Thus, scheduled event data may be used to influence determination of a prime contact based on the contact associated with a scheduled event and proximity in time of the scheduled event.

User activity data may include contact list use data along with data from other peripheral applications, such as a file management application, a camera application, a game application, etc. User activity data may track, for example, association of use of a peripheral application (e.g., taking a picture) with a subsequent communication (e.g., sending an SMS communication to a particular contact). Thus, user activity data may be used to influence determination of a prime contact based on the association of a particular contact with a particular user activity.

Rule manager 430 may include rules and/or settings for rules to which data from device data manager 420 can be applied. Rules manager 430 may include user-configurable rules and/or non-user-configurable rules provided, for example, as part of original equipment manufacturer (OEM) components or via software download. In one implementation, rule manager 430 may maintain a group of pre-configured sort rules from which a user may select. Exemplary sort rules may include, for example, location-based rules, time-based rules, communication activity rules, activity type rules, schedule-based rules, and/or a combination of rules. As described in more detail herein, a user may select and/or prioritize particular sort rules from the group of sort rules. Rule manager 430 may then configure the selected rules into a single sort procedure.

Although FIG. 4 shows exemplary functional components of device 200, in other implementations, device 200 may contain fewer, different, differently-arranged, or additional functional components than depicted in FIG. 4. In still other implementations, a functional component of device 200 may perform one or more tasks described as being performed by another functional component of device 200.

Figure 5:
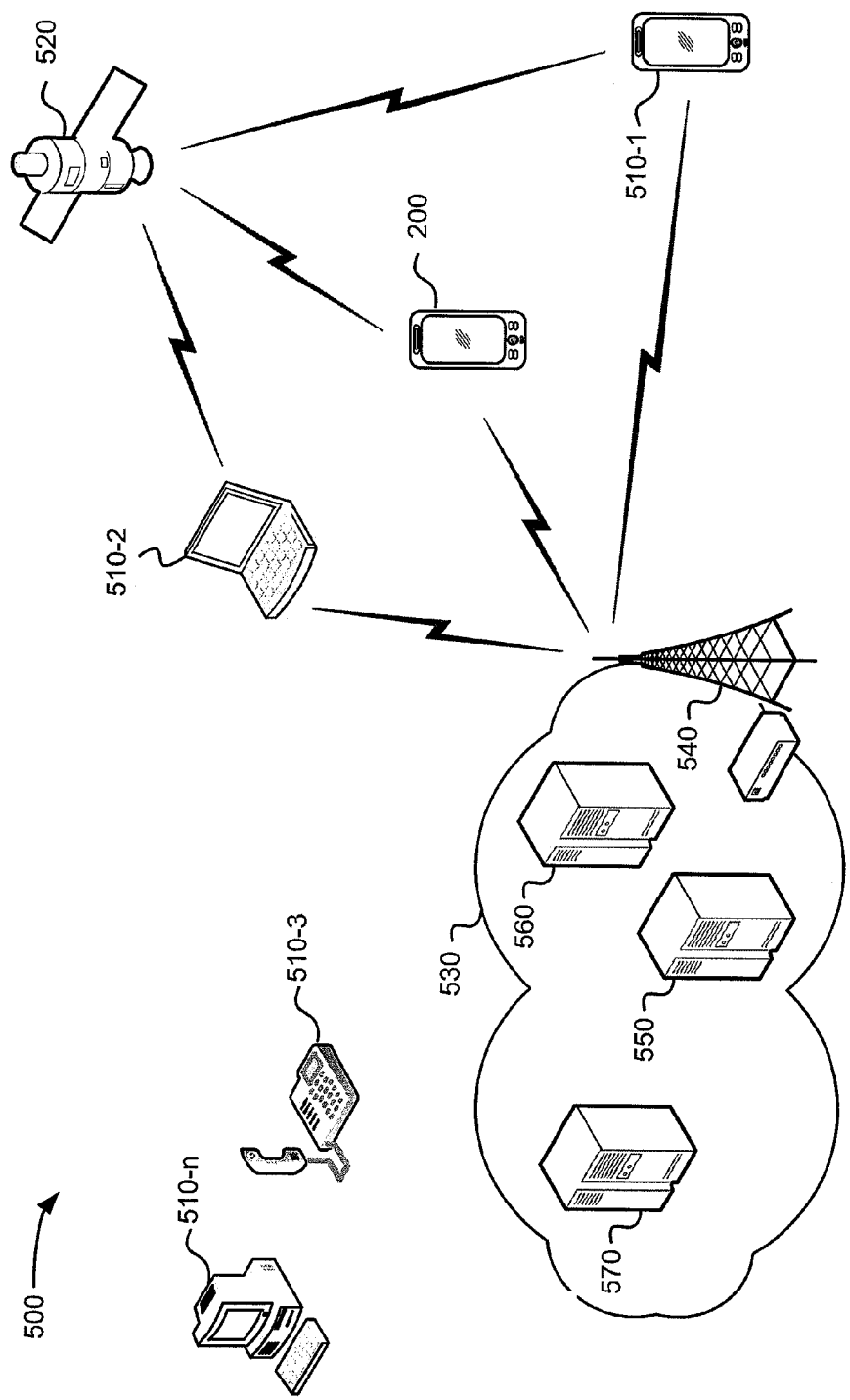
FIG. 5 depicts a diagram of an exemplary network environment in which systems and/or methods described herein may be implemented.

FIG. 5 depicts a diagram of an exemplary network environment 500 in which systems and methods described herein may be implemented. As shown, network environment 500 may include device 200, one or more other devices 510-1 through 510-n (generically referred to as "other device 510" and collectively referred to as "other devices 510"), one ore more satellites 520, and a network 530.

Other devices 510 may include mobile devices (e.g., other devices 510-1, 510-2) and/or stationary devices (e.g., other devices 510-3, 510-n) that are associated with contacts of device 200. For example, the phone number for each of devices 510 may be stored as part of a contacts list in device 200.

Satellite(s) 520 may be, for example, a GPS satellite or a satellite for a global navigation satellite system (GNSS). Device 200 and/or some of other devices 510 may communicate with one or more satellites 520 and network 530. For example, device 200 may send a signal to satellite(s) 520 to request position information. Satellite(s) 520 may respond to the signal from device 200 by providing latitude and longitude coordinates indicating the position of device 200.

Network 530 may include a radio access network (RAN) 540, a position determining entity (PDE) 550, a device location client (DLC) 560, and a contact information server 570. Network 530 may connect device 200 to a variety of provider services, including a location-based service infrastructure. RAN 540 may include a variety of components to facilitate mobile communications, such as antennas, base stations, mobile switching centers, and interfaces with Public Switched Telephone Networks (PSTNs) and/or packet data servicing nodes (PDSNs).

PDE 550 may include one or more components that determine the position of device 200 and/or to help device 200 determine its own position. PDE 550 may, for example, track the position of satellite(s) 520 through a network of stationary GPS receivers distributed across the coverage area of a wireless network. PDE 550 may, for example, determine an approximate location of device 200 based on the signal from a local base station and provide device 200 with the identities and positions of satellite(s) that are likely to be in range of device 200. PDE 550 may support one or more position determining technologies or procedures to gather location information.

DLC 560 may include one or more components that collect and provide real-time (or near real-time) location information for other devices 510. As shown in the exemplary implementation of FIG. 5, DLC 560 may operate as separate component (e.g., a server) within network 530. DLC 560 may receive position information for both mobile devices and stationary other devices 510. DLC 560 may, for example, receive location information from another server (e.g., contact information server 570) about the location of a particular stationary other device 510-3. DLC 560 may store information received from other devices 510 and provide the information to device 200 via a network connection.

Contact information server 570 may include one or more components that identify location information for stationary other devices 510. For example, stationary other devices 510 may have position information that may be obtained from customer records (e.g., address information) associated with the devices. Customer addresses may be converted, for example, to GPS coordinates that may be compared against determined coordinates for device 200.

In another implementation, contact information server 570 may also function as a web server that provides user access to contact sort settings. As described further herein, contact information server 570 may be accessed by a device (e.g., device 200 or other device 510) that may retrieve information from contact information server 570. Contact information server 570 may store and provide contact list, sorting rules and/or customized sorting procedures to device 200 to implement dynamic contact list 100.

In systems and/or methods described herein, device 200 may establish wireless connections within network 530. Device 200 may determine its own position by communicating with one or more of satellite 520, RAN 540, PDE 550, DLC 560, or another device 510. In one implementation, when device 200 receives a command to display a contact list, device 200 may identify the locations of other devices 510 associated with contacts in the user's contact list. The locations of other devices 510 may be determined, for example, either through real-time requests or retrieval of periodically updated information (e.g., from DLC 560). Device 200 may apply its own geographic location information and the known geographic locations of other devices 510 associated with contacts in the contact list of device 200 to determine the relative positions of device 200 and other devices 510.

Although the configuration of FIG. 5 shows exemplary components of network environment 500, in other implementations, fewer, different, differently-arranged, or additional components may be used. In other implementations, features of certain components may be combined. For example, in one implementation, one or more functions of RAN 540, PDE 550, DLC 560, and/or contact information server 570 may be combined. Conversely, a single component may be implemented as multiple, distributed components. For example, PDE 550, DLC 560 and/or contact information server 570 may be distributed components. Further, connections between the various components may be directly made or may be indirectly made via a node, a network, or a combination thereof.

Figure 6:
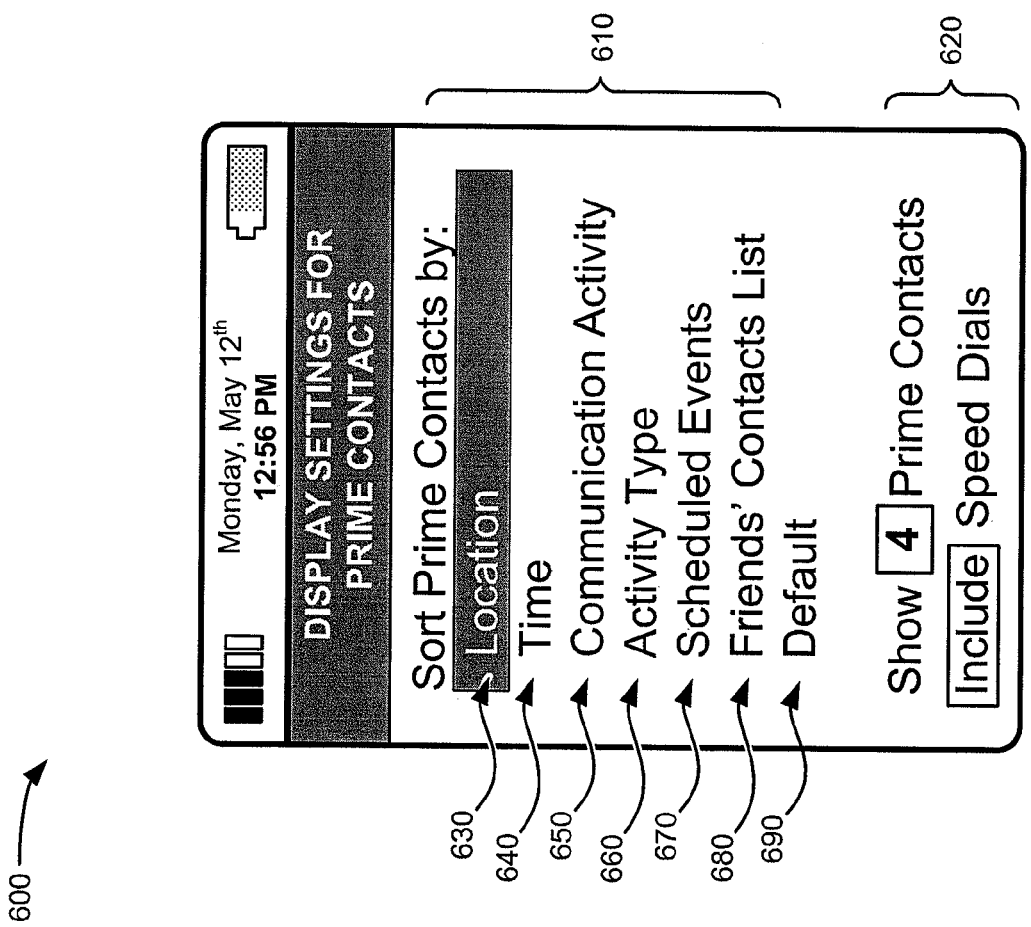
FIGS. 6 and 7 provide diagrams of exemplary contact display rules user interfaces for the device of FIG. 2.

FIG. 6 provides a diagram of an exemplary rules interface 600 for a dynamic contact list according to implementations described herein. Rules interface 600 may be displayed, for example, on a screen of device 200 to control the display of dynamic contact list 100 of FIG. 1. Rules interface 600 may include a sorting rule section 610 and a display format section 620. Sorting rule section 610 may include a location-based rule identifier 630, a time-based rule identifier 640, a communication activity rule identifier 650, an activity type rule identifier 660, a schedule-based rule identifier 670, a friends' contact list rule identifier 680, and a default rule identifier 690. Although FIG. 6 shows exemplary options for rules interface 600, in other implementations, rules interface 600 may contain fewer, different, differently-arranged, or additional options than depicted in FIG. 6.

Sorting rule section 610 may include options (i.e., rule identifiers 630, 640, 650, 660, 670, and 680) that may be selected by a user to define how prime contacts (e.g., list 125 for prime contacts section 120) may be determined. Each rule identifier may correspond to a rule that device 200 (e.g., rule manager 430) may apply to data (e.g., from device data manager 420) to present dynamic contact list 100.

Display format section 620 may include options that may be selected by a user to define how prime contacts (e.g., list 125 for prime contacts section 120) may be displayed. For example, display format section 620 may include options that allow a user to select how many prime contact identifiers may be shown in list 125 (e.g., from 0 to 10 or more, depending on the display capacity of device 200). As another example, display format section 620 may include options that allow a user to include or exclude from list 125 contacts numbers already associated with another convenient access, such as a speed dial number. Other options (not shown) may also be included in display format section 620, such as font size, indicators for what sort criteria was is being used by device 200, options to duplicate prime contact entries from list 125 in list 115, etc.

Location-based rule identifier 630 may correspond to a rule that device 200 may use to sort contacts based on the location of user device 200 and/or the location of devices associated with one or more contact. In one implementation, device 200 may determine its location (e.g., a geographic position determined in conjunction with satellite 520) and identify contacts that are closest to the determined location. For example, if device 200 of a user from Chicago determines its current location to be in Washington, D.C., device 200 may identify contacts in or near Washington, D.C., as prime contacts. In another implementation, device 200 may determine its location and identify contacts most frequently associated with the determined location. For example, a user may typically call one or two particular contacts from a certain location. Thus, device 200 may identify those one or two particular contacts as prime contacts when device 200 identifies that certain location.

In another implementation, location-based rule identifier 630 may correspond to a rule that device 200 may use to sort contacts based on a current (e.g., real-time or near real-time) geographic position of a user's device 200 in relation to the geographic position of the user's contacts (e.g., the location of other devices 510 associated with the user's contacts). For example, DLC 560 and/or contact information server 570 may compile geographic position information received from other devices 510 and provide the information to device 200 via a network connection. Device 200 may determine its own geographic position (e.g., in conjunction with satellite 520) and identify contacts with a current geographic position that is closest to the determined location of device 200. Device 200 may display the closest contacts or contacts within a particular distance threshold as prime contacts.

Time-based rule identifier 640 may correspond to a rule that device 200 may use to sort contacts based on the time of day and prior communications patterns. In one implementation, device 200 may determine the current time of day and identify contacts that are typically called during or near that time. Call patterns may also be distinguished based on days of the week (e.g., Sunday, Monday, etc.) and types of days (e.g., weekend/weekdays, holidays, etc.).

Communication activity rule identifier 650 may correspond to a rule that device 200 may use to sort contacts based on levels communications activities. In one implementation, device 200 may identify contacts used in communications within a particular time period (e.g., communications to and/or from contacts within the past several hours/days/months). In another implementation, device 200 may identify contacts used only in recently sent communications or recently received communications.

Activity type rule identifier 660 may correspond to a rule that device 200 may use to sort contacts based on types of user activities associated with device 200. Device 200 may track communication patterns associated with use of peripheral applications in device 200. For example, if a user of device 200 is playing (or has recently played) a game, device 200 may identify one or more contacts with whom a user typically communicates when playing a game. Similarly, when a user of device 200 uses dynamic contact list 100 to send a picture, device 200 may identify one or more contacts to which the user has previously sent pictures.

Schedule-based rule identifier 670 may correspond to a rule that device 200 may use to sort contacts based on events in a calendar program or another peripheral application. For example, device 200 may identify contacts associated with the scheduled events and rank the contacts based on how close in time is the scheduled event.

Friends' contact list rule identifier 680 may correspond to a rule that device 200 may use to sort contacts based on the ranking of a user within the prime contacts of other user devices 510. For example, if the user of device 200 is included as a prime contact in one or more other users' contact list, device 200 may solicit such information from contact information server 570 (or another device) and rank the user's contacts based on how other devices 510 have ranked the user. Thus, more generally, the sorting of dynamic contact list 100 in user device 200 may be determined, at least in part, by the sorting rules in other devices 510.

Default rule identifier 690 may correspond to a procedure that device 200 may use to sort contacts based on a combination of factors, such as a combination of the procedures from two or more of location-based rule identifier 630, time-based rule identifier 640, communication activity rule identifier 650, activity type rule identifier 660, schedule-based rule identifier 670, and friends' contact list rule identifier 680. In one implementation, time, location, event associations, and communication patterns may be weighted to determine a list of prime contacts. Default rule identifier 690 may, for example, correspond to a procedure that weights the location of a particular contact more heavily if it is determined to be within a certain radius (e.g., 10 miles).

In operation, rules interface 600 may be displayed on a screen (e.g., display 230) of device 200. A user may select (using, e.g., user interface 320) options from rules interface 600 to define settings for the selection and display of dynamic contact list 100. The selected settings may then be used by processor 300 to display dynamic contact list 100 the next time a user requests device 200 to display dynamic contact list 100.

Figure 7:
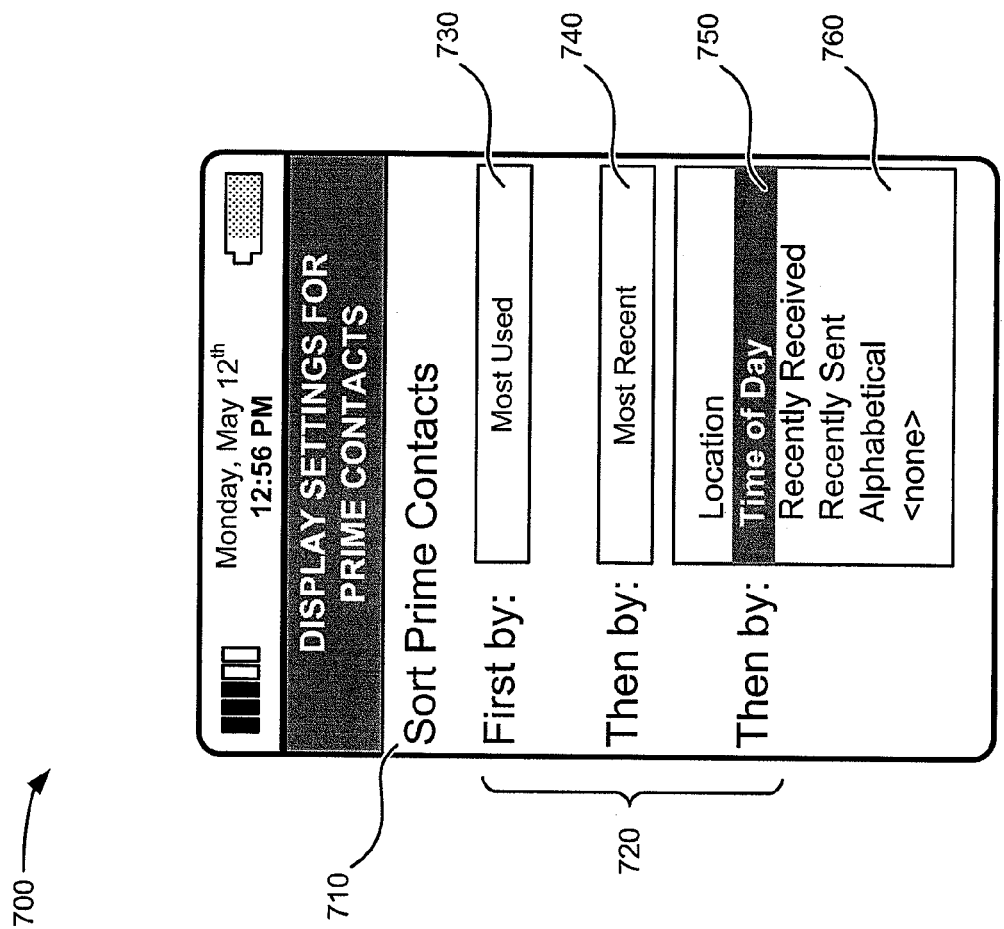

FIG. 7 provides a diagram of another exemplary rules interface 700 for a dynamic contact list according to implementations described herein. Rules interface 700 may be displayed, for example, on a screen of device 200 to control the display of dynamic contact list 100 of FIG. 1. Rules interface 700 may include a sorting rule section 710 that includes a prioritization menu 720 for multiple rule identifiers. Rule identifiers may be the same or similar to location-based rule identifier 630, time-based rule identifier 640, communication activity rule identifier 650, activity type rule identifier 660, schedule-based rule identifier 670, and/or friends' contact list rule identifier 680 described above with respect to FIG. 6. Prioritization menu 720 may include user input boxes 730, 740, and 750 to define sorting criteria for prime contact list 125. In the exemplary implementation of FIG. 7, rule identifiers for prioritization menu 720 may be selected from a list of rule identifiers. The list of rule identifiers may be provided, for example, as a drop-down menu, such as drop-down menu 760. Although FIG. 7 shows exemplary options for rules interface 700, in other implementations, rules interface 700 may contain fewer, different, differently-arranged, or additional options than depicted in FIG. 7.

In operation, rules interface 700 may be displayed on a screen (e.g., display 230) of device 200. A user may select (using, e.g., user interface 320) options from rules interface 700 to define settings for the selection of contact identifiers for dynamic contact list 100. In another implementation rules interface 700 may be divided into multiple windows that can be manipulated by a user in sequence. The selected settings may then be used by processor 300 to display dynamic contact list 100 the next time a user requests device 200 to display dynamic contact list 100.

Figure 8A:
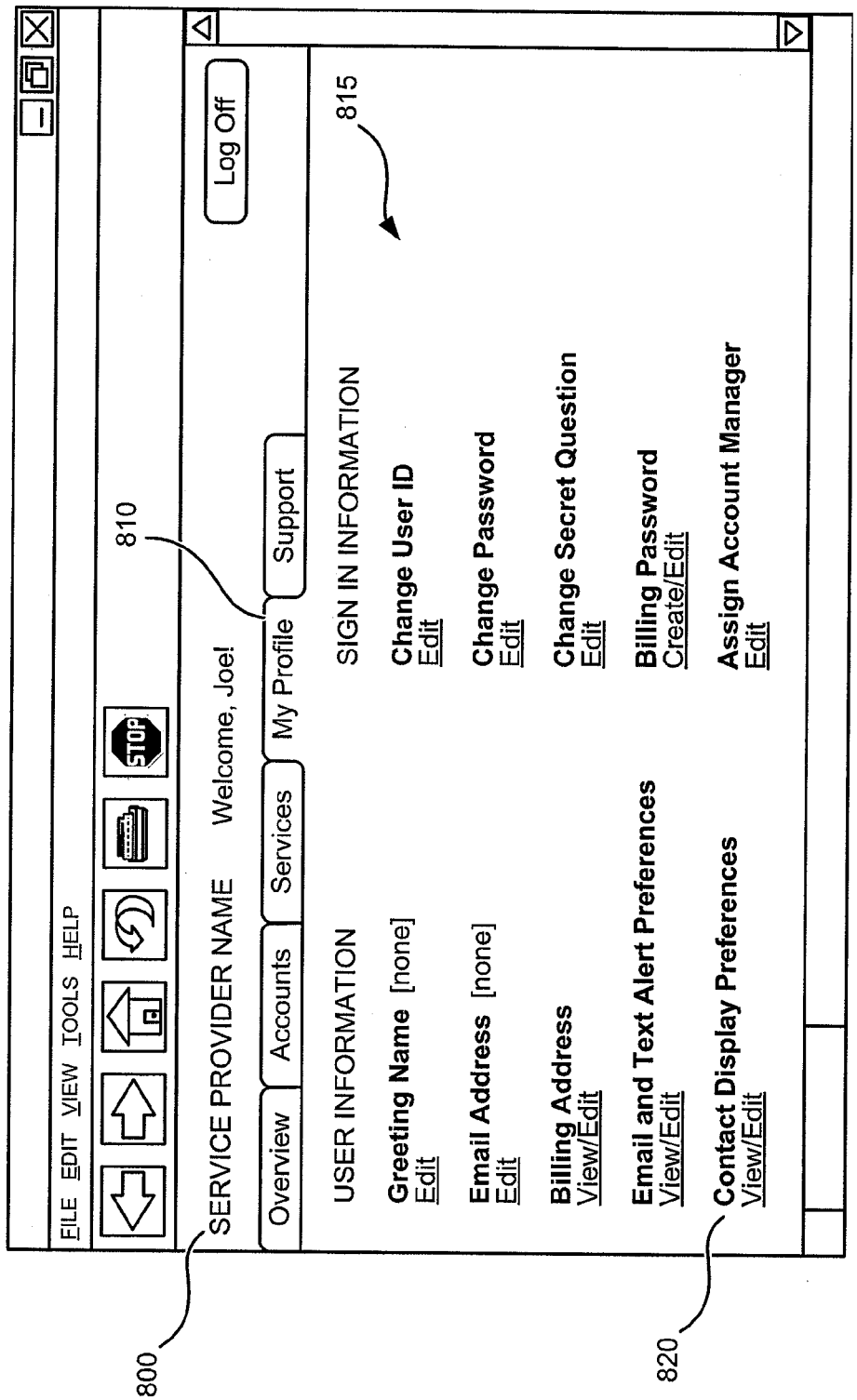
FIGS. 8A and 8B provide exemplary web-based user interfaces for controlling a dynamic contact list.
Figure 8B:
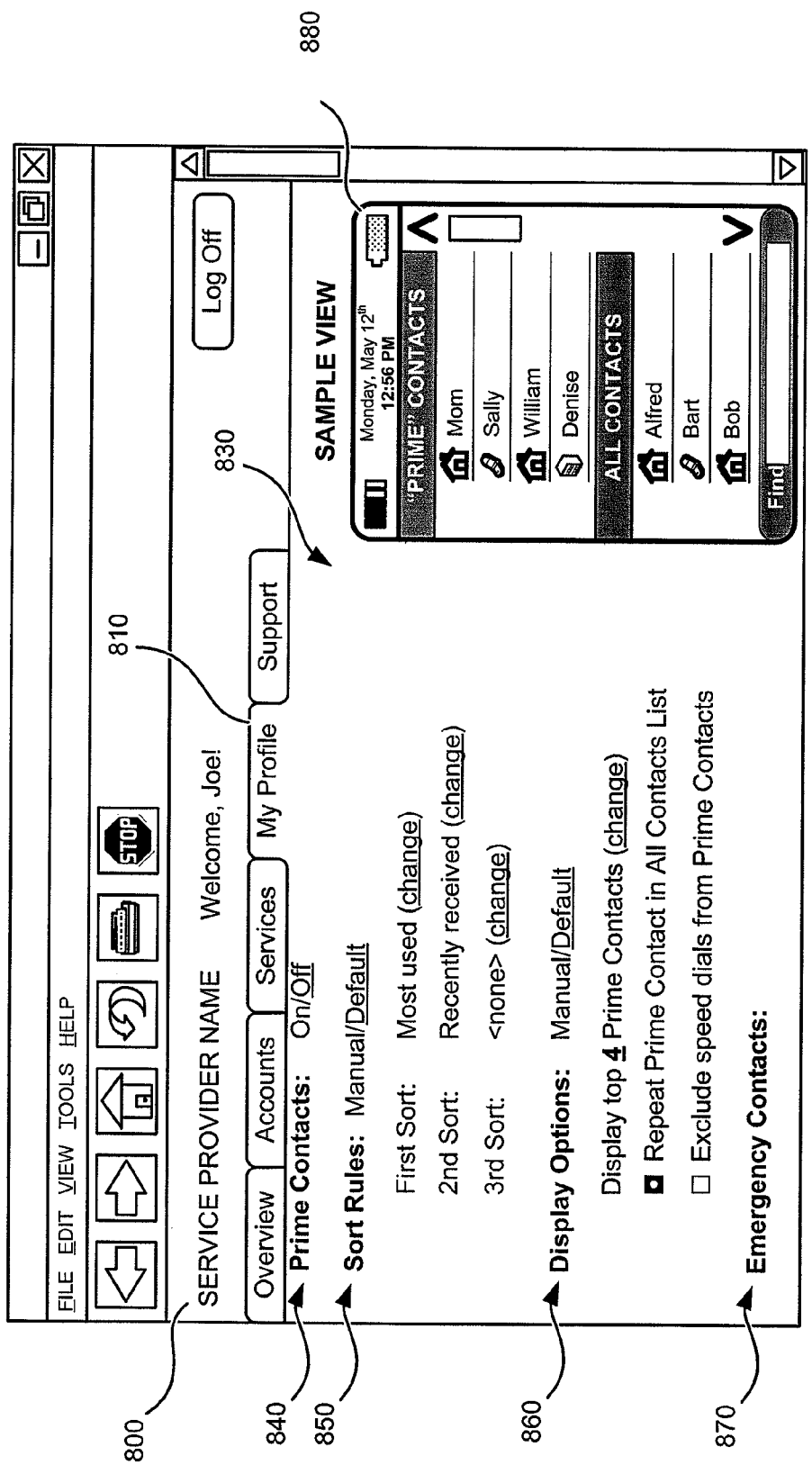

FIGS. 8A and 8B provide an exemplary web-based user interfaces for controlling a dynamic contact list. The web-based user interfaces may be accessed by a device (e.g., device 510) that may retrieve information from contact information server 570 or another server associated with network 530 of FIG. 5. In one implementation, device 510 may include any device (including device 200) that is capable of accessing a software application or a web-based application that enables a user of user device 510 to request, review, and/or edit user account information for device 200. For example, a user may be provided with a user name and password that allows the user to access stored information from a server (such as contact information server 570) according to the rights granted to the user account. Using the web-based interface, a user may modify criteria for contact list sorting and/or display settings of device 200. The modified criteria may then be sent from contact information server 570 to device 200 for implementation on device 200.

Referring to FIG. 8A, an exemplary web page 800 for a user account associated with a user of device 200 is shown. Web page 800 may include multiple tabs that present groups of information related to the user's account. A my profile tab 810 may include a home view 815 that may allow a user to access a variety of personal information and preferences, such as a greeting name used on device 200, an email address associated with the account, a billing address, and alert preferences. Home view 815 may also include a contact display preferences option 820 that may be selected by a user to view and/or change settings for the display of dynamic contact list 100 on device 200. Although FIG. 8A shows exemplary options for home view 815, in other implementations, home view 815 may contain fewer, different, differently-arranged, or additional sections than depicted in FIG. 8A. Selection of contact display preferences option 820 may open a new web page 830, shown in FIG. 8B.

Referring to FIG. 8B, another exemplary web page 800 is shown and may include a contact display preferences interface 830 for a user account associated with a user of device 200. Contact display preferences interface 830 may include an on/off section 840, a sort rules section 850, a display options section 860, an emergency contacts section 870, and a sample view section 880. Although FIG. 8B shows exemplary options for contact display preferences interface 830, in other implementations, contact display preferences interface 830 may contain fewer, different, differently-arranged, or additional sections than depicted in FIG. 8B.

On/off section 840 may provide user with the option to activate or disable use of prime contacts in dynamic contact list 100.

Sort rules section 850 may include user input fields to define sorting criteria for prime contact list 125 in device 200. For example, a user may select between manually selecting sort rules and using a default sort procedure (e.g., a procedure defined by, for example, a network service provider). If the manual option is selected for sort rules section 850, a user may define criteria sort criteria to be used for a contacts list (e.g., dynamic contact list 100). In the exemplary implementation of FIG. 8B, rule identifiers for sort rules section 850 may be selected from a list of rule identifiers. The rule identifiers may be the same or similar to location-based rule identifier 630, time-based rule identifier 640, communication activity rule identifier 650, activity type rule identifier 660, schedule-based rule identifier 670, and/or friends' contact list rule identifier 680 described above with respect to FIG. 6. However, other rule identifiers (and corresponding rules) may also be used. In the implementation of FIG. 8B, the list of available rule identifiers may be displayed and selected, for example, by a user selecting the "change" link next to the currently shown rule identifiers for "First Sort," 2nd Sort," and "3rd Sort," respectively.

Display options section 860 may include user input fields to define display criteria for prime contact list 125 in device 200. For example, a user may select between manually selecting display options and using default display settings. If the manual option is selected for display options section 860, a user may define display options to be used for a contacts list (e.g., dynamic contact list 100). For example, a user may select the number of contact identifiers to display in prime contacts section 120. A user may also select other features, such as whether contact identifiers used in prime contacts section 120 will also be repeated in the alphabetical all contacts section 110 and whether contacts associated with a speed dial feature may be excluded from prime contacts section 120.

Emergency contacts section 870 may include user input fields to define criteria of emergency contacts included in contact list 125 in device 200. For example, emergency contacts section 870 may allow a user to define multiple contacts as an in-case-of-emergency (ICE) contact. Each of the multiple contacts may become the primary ICE contact depending on, for example, selected sort rules in sort rules section 850 or an independent set of sort rules. For example, the primary ICE contact may be configured to change based on the geographic location of device 200. For example, a minor who splits time living with a primary custodian and a secondary custodian may have device 200 configured to include a first primary ICE contact 870 when device 200 is in the geographic vicinity of the primary custodian's premises and a second primary ICE contact when device 200 is in the vicinity of the secondary custodian's premises.

Sample view section 880 may provide a sample view of how dynamic contact list 100 would appear on a particular device 200. Sample view section 880 may, for example, include a real-time representation of how selected display options may alter the appearance of dynamic contact list 100. In one implementation, sample view section 880 may incorporate model awareness, such that the display in sample view section 880 matches a particular model of device 200 used by the user. Model awareness may be determined based on, for example, information associated with the user account used to access web page 800.

Figure 9:
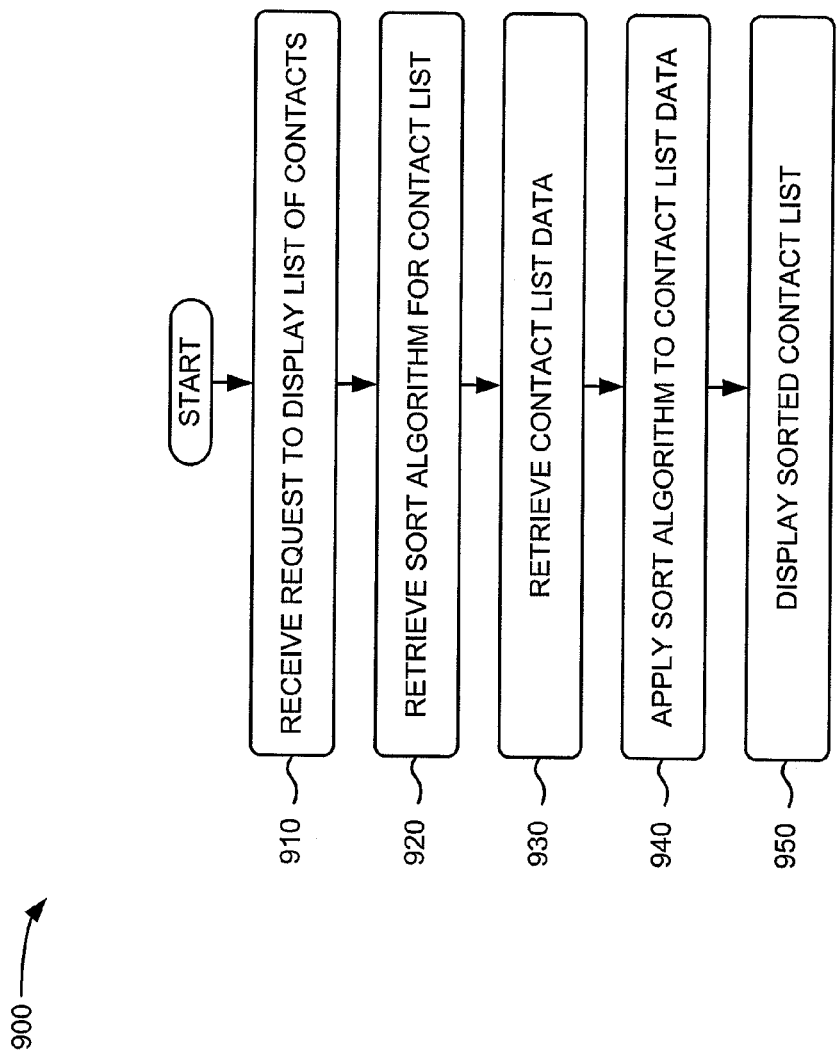
FIG. 9 depicts a flow chart of an exemplary process for presenting a dynamic contact list.

FIG. 9 depicts a flow chart of an exemplary process 900 for presenting a dynamic contact list according to implementations described herein. In one implementation, process 900 may be performed by device 200. In another implementation, some or all of process 900 may be performed by another device or a group of devices, including or excluding device 200.

As illustrated in FIG. 9, process 900 may begin with receiving a request to display a list of contacts (block 910). For example, device 200 may receive a request via user interface 320 to display a contact list.

A sort procedure for the contact list may be retrieved (block 920). For example, contact list controller 410 of device 200 may retrieve (e.g., from rule manager 430) a sort procedure based on sort rules previously selected/configured by a user of device 200. In one implementation, the sort procedure may include one or more rules to identify prime contacts (e.g., location-based rules, time-based rules, communication activity rules, activity type rules, schedule-based rules and/or default rules) and a particular number or prime contacts to display. A method for selecting the sort rules used in the sort procedure of block 920 is described below with respect to FIG. 10.

Still referring to FIG. 9, contact list data may be retrieved (block 930). For example, contact list controller 410 of device 200 may retrieve (e.g., from device data manger 420) contact list data. Contact list data may include, for example, contact list identifiers and information associated with each contact identifier that may be applicable to the retrieved sort procedure. For example, if the retrieved sort procedure includes location-based rules, device 200 may retrieve current location information for device 200 and/or for devices associated with each contact identifier.

The sort procedure may be applied to the contact list data (block 940). For example, contact list controller 410 of device 200 may apply the sort procedure to the contact list data to identify a selected number of prime contacts.

A sorted contact list may be displayed (block 950). For example, contact list controller 410 of device 200 may present, on display 230, a dynamic contact list that includes the selected number of prime contacts. In another example, contact list controller 410 of device 200 may present on display 230 a complete listing of all contacts sorted based on the retrieved and applied rules.

Figure 10:
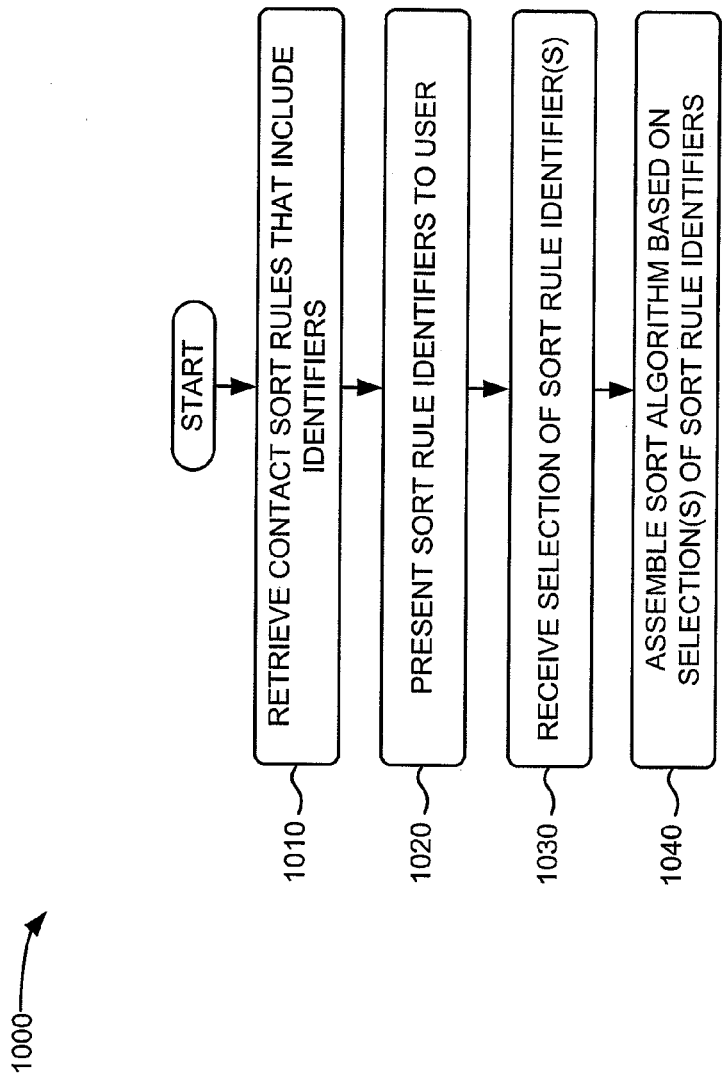
FIG. 10 depicts a flow chart of an exemplary process for defining a contact sort procedure for a dynamic contact list.

FIG. 10 depicts a flow chart of an exemplary process 1000 for defining contact a sort procedure for a dynamic contact list according to implementations described herein. In one implementation, process 1000 may be performed by device 200. In another implementation, some or all of process 1000 may be performed by another device or a group of devices, including or excluding device 200.

As illustrated in FIG. 10, process 1000 may begin with retrieving contact sort rules that include identifiers (block 1010). For example, device 200 (e.g., rules manager 430) may retrieve a group of contact sort rules from memory 310. The multiple contact sort rules may be included in the memory of device 200 as an OEM component for device 200 or downloaded (e.g., from contact information server 570) to memory 310 via network 530. Each of the multiple contact sort rules may include a sort rule identifier that may by used to indicate to a user the nature of the sort rule. For example, a sort rule identifier may include a title (e.g., "location," "most recent," "local," etc.) and/or a brief description of the sort properties of the rule. In another implementation, the contact sort rules may be retrieved directly from a memory external to device 200 (e.g., a remote server).

Sort rule identifiers may be presented to the user (block 1020). For example, device 200 (e.g., rules manager 430) may present to a user (e.g., via display 230) a list of sort rule identifiers that can be selected, combined, arranged, or otherwise manipulated by the user. In the exemplary implementation of FIG. 6, sort rule identifiers are shown in rules interface 600 as location-based rule identifier 630, time-based rule identifier 640, communication activity rule identifier 650, activity type rule identifier 660, schedule-based rule identifier 670, friends' contact list rule identifier 680, and default rule identifier 680.

Selection of one or more sort rule identifiers may be received (block 1030). For example, device 200 may receive user input (e.g., via user interface 320) to select one or more sort rule identifiers. Selection of the number of sort rule identifiers may be constrained by the type of rules interface provided to the user. In the exemplary implementation of FIG. 6, rules interface 600 may permit selection of a single rule identifier. By contrast, in the exemplary implementation of FIG. 7, rules interface 700 may permit multiple rule identifiers to be selected and/or ranked.

A sort procedure may be assembled based on the selection of the one or more sort rule identifiers (block 1040). For example, device 200 (e.g., rules manager 430) may compile sort rules associated with the selected sort rule identifiers into a single procedure or set of call functions to be used by contact list controller 410 to sort a contact list.

In another implementation, process 1000 may initially retrieve only the contact sort rule identifiers and not the corresponding contact sort rules. For example, device 200 may retrieve contact sort rule identifiers from a remote server via a network 530. After a the contact sort rule identifiers have been presented to the user and the desired selections received, device 200 may send an indication of the selected sort rule identifiers to the remote server and receive from the remote server a sort procedure based on the selected contact sort rule identifiers.

Figure 11:
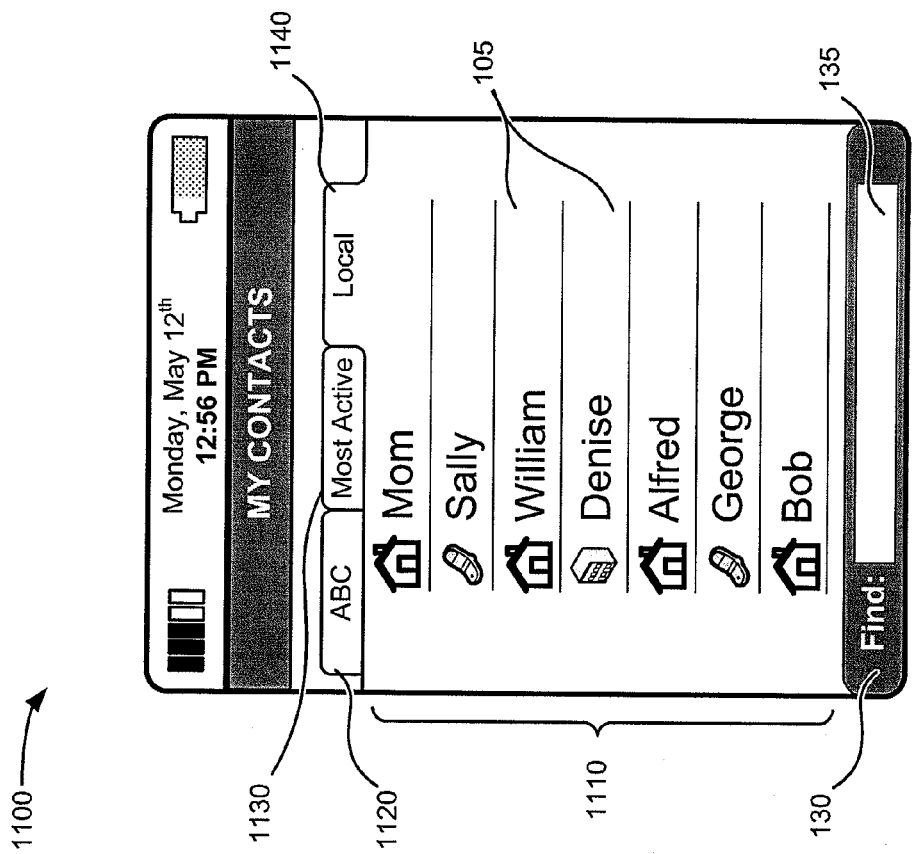
FIG. 11 provides a diagram illustrating another exemplary implementation of a dynamic contact list that may be implemented the device of FIG. 2.

FIG. 11 provides a diagram illustrating another exemplary implementation of a dynamic contact list 1100 that may be implemented in device 200. Dynamic contact list 1100 may include a contact list display section 1110 and multiple tabs 1120, 1130 and 1140 that allow for presentation of differently sorted contact identifiers 105. Each of tabs 1120, 1130 and 1140 may be associated with a different sort rule.

In the exemplary implementation of FIG. 11, tab 1120 may designated to display an alphabetical listing of contact identifiers 105. Tab 1130 may be designated to display a listing of contact identifiers 105 based on the amount of communication activity associated with each contact identifier. Tab 1140 may be designated to display a listing of contact identifiers 105 based on the geographic location of device 200 in relation to location information associated with each of the contact identifiers. Tabs 1120, 1130 and 1140 may be selected (e.g., via user interface 320 of device 200) by a user to display a sorted contact list based on the criteria associated with the selected tab 1120, 1130 or 1140.

Search section 130 may include a user interface (e.g., search window 135) that allows input of search terms to further limit the contact identifiers 105 shown in contact list display section 1110. For example, a user may input into search window 135 and letter or character sequence so that the contact identifiers 105 shown in contact list display section 1110 may be limited to contact identifiers 105 that begin with or include the entered letter or character sequence.

Although FIG. 11 shows exemplary sections of dynamic contact list 1100, in other implementations, dynamic contact list 1100 may contain fewer, different, differently arranged, or additional information than depicted in FIG. 11. For example, dynamic contact list 1100 may include a different number and/or arrangement of tabs. The tabs may also be associated with different sorting rules than those displayed in FIG. 11. Also, dynamic contact list 1100 may include a different number and/or arrangement of displayed contact identifiers 105 within contact list display section 1110.

Figure 12:
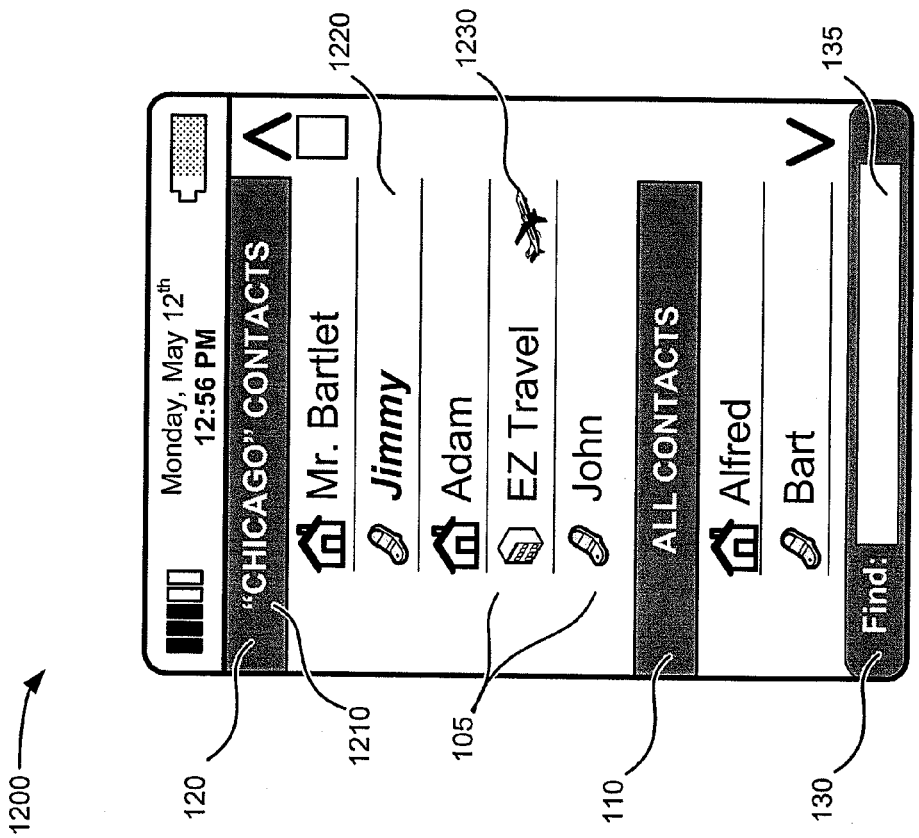
FIG. 12 provides a diagram illustrating still another exemplary implementation of a dynamic contact list that may be implemented the device of FIG. 2.

FIG. 12 provides a diagram illustrating another exemplary implementation of a dynamic contact list 1200 that may be implemented in device 200. Similar to dynamic contact list 100 of FIG. 1, dynamic contact list 1200 may include all contacts section 110, a prime contacts section 120, and a search section 130 that allow for presentation of differently sorted contact identifiers 105. Dynamic contact list 1200 may also include a dynamic banner 1210 for prime contacts section 120, dynamic fonts 1220 for contact identifiers 105, and one or more icons 1230 for contact identifiers 105.

As shown in FIG. 12, prime contacts list section 120 may include a visual indication of which rule(s) and/or conditions(s) are presently influencing the display of contact identifiers 105 within prime contact list section 120. For example, banner 1210 for prime contacts section 120 may include a name of a rule (e.g., one of rule identifiers 630, 640, 650, 660, 670, or 680), a location (e.g., "Chicago"), or a time period (e.g., "weekend"). In another implementation, banner 1210 may include different colors or fonts corresponding to the currently applied rules in prime contact section 120. Contact identifiers 105 may also be presented with different colors and/or fonts associated with particular rules. For example, dynamic font 1220 may associate "Jimmy" with a particular rule and distinguish "Jimmy" from other contact identifiers 105 in prime contacts section 120. In another implementation, contact identifiers 105 may be presented with one or more adjacent indicators, such as icon 1230, associated with a particular rule and/or condition.

Although FIG. 12 shows exemplary features of dynamic contact list 1200, in other implementations, dynamic contact list 1200 may contain fewer, different, differently arranged, or additional features than depicted in FIG. 12. For example, dynamic contact list 1200 may include only or a different combination of dynamic banner 1210, dynamic fonts 1220, and/or icons 1230.

Figure 13A:
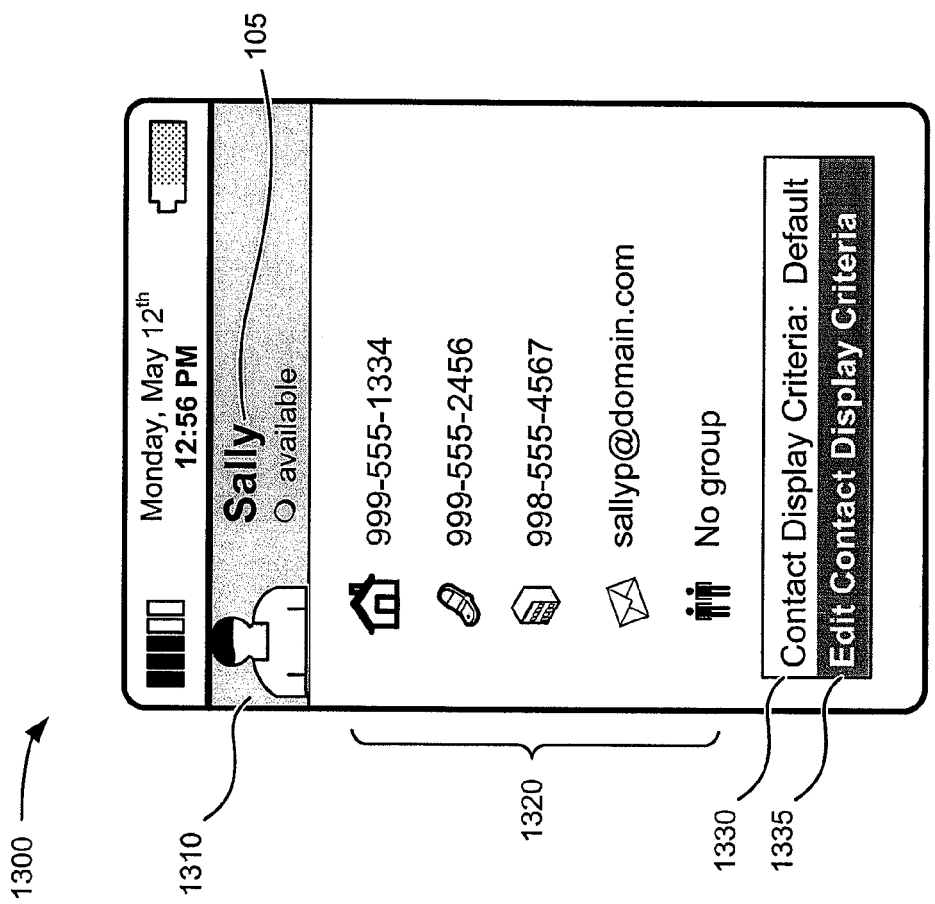
FIGS. 13A and 13B provide diagrams of an exemplary contact page user interface that may be implemented the device of FIG. 2.
Figure 13B:
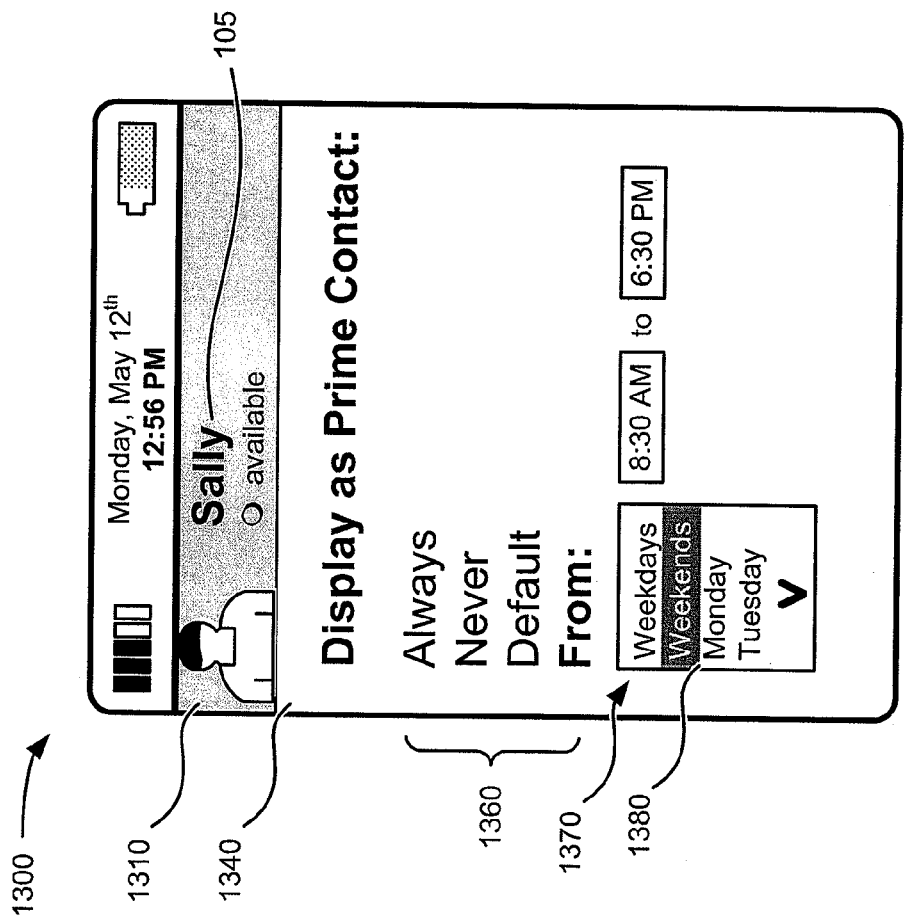

FIGS. 13A and 13B provide diagrams of an exemplary contact page interface 1300 for a dynamic contact list according to implementations described herein. Contact page interface 1300 may be displayed, for example, on a screen of device 200 to display individual contact information and to control the display of an individual contact in relation to contact list 100 of FIG. 1. Contact page interface 1300 may include a contact identifier section 1310, a contact information section 1320, and a display criteria section 1330.

Contact identifier section 1310 may include a name, image, presence indication (e.g., available, busy, idle, etc.) or other information for a particular contact identifier 105 (e.g., "Sally"). Contact information section 1320 may include stored information relating to the contact identifier 105 in contact identifier section 1310, such as phone numbers, addresses, group associations, etc. Display criteria section 1330 may include an indication of a current display criteria selection (e.g., "Default") and a menu option 1335 to edit the contact display criteria for the particular contact. Selection of menu option 1335 by a user may cause device 200 to present a contact display settings window 1340 (FIG. 13B). In other implementations, contact display settings window 1340 may be included within the same window as contact page interface 1300.

Contact display settings window 1340 may include options for how the particular contact identifier 105 identified in contact identifier section 1310 may be displayed in dynamic contact list 100. Display options section 1360 may include various options indicating under what circumstances contact identifier 105 may be displayed. Thus, rules for individual contacts may be used to supplement or override other contact rules, such as contact rules discussed with respect to FIG. 6. For example, as shown in section 1360, a user may select to display a particular contact indicator as a prime contact always, never, default (e.g., subject to contact rules for all contacts), or at particular times. An interval selection menu 1370 may be provided to allow a user to identify particular times to display contact identifier 105. In the exemplary implementation of FIG. 13, time intervals for interval selection menu 1370 may be selected from a list time intervals. The list of time intervals may be provided, for example, as a drop-down menu, such as drop-down menu 1380.

In operation, contact page interface 1300 may be displayed on a screen (e.g., display 230) of device 200. A user may select (using, e.g., user interface 320) options from contact page interface 1300 to define display settings for a selected contact indicator for dynamic contact list 100. In another implementation, contact page interface 1300 may be divided into a single window or into more than two windows that can be manipulated by a user in sequence.

Although FIGS. 13A and 13B show exemplary options for contact page interface 1300, in other implementations, contact page interface 1300 may contain fewer, different, differently-arranged, or additional options than depicted in FIGS. 13A and 13B. For example, addition rules for display of a particular contact indicator within dynamic contact list 100 may be provided.

Systems and/or methods described herein may provide a dynamic contact list for a mobile device that presents address book contacts in varying arrangements based on external factors. A mobile device may receive a request to display a list of contacts and retrieve a sort procedure for the contact list. The sort procedure may be based on a user's prior selections from a group of contact sort rules. The mobile device may retrieve a list of contact identifiers and other information associated with each contact identifier that is applicable to the sort procedure. The mobile device may then apply the sort procedure to the list of contact identifiers and to the information associated with each contact identifier so as to displaying a sorted list of contact identifiers based on the applied sort procedure.

The foregoing description of implementations provides illustration and description, but is not intended to be exhaustive or to limit the invention to the precise form disclosed. Modifications and variations are possible in light of the above teachings or may be acquired from practice of the invention.

For example, while implementations have been described primarily in the context of a mobile device (such as a radiotelephone, a PCS terminal, or a PDA), in other implementations the systems and/or methods described herein may be implemented on other computing devices such as a laptop computer or a portable gaming system.

Also, while series of blocks have been described with regard to FIGS. 9 and 10, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    identifying, by a computing device, a plurality of contact identifiers corresponding to a plurality of contacts associated with a user of the computing device;
    providing, by the computing device and for display via a user interface, a plurality of contact sort rules for sorting the plurality of contact identifiers,
    the plurality of contact sort rules including:
    a first contact sort rule associated with sorting the plurality of contact identifiers based on locations associated with devices associated with the plurality of contacts,
    a second contact sort rule associated with sorting the plurality of contact identifiers based on a type of user activity preceding receipt of a request to display a sorted list of contact identifiers,
    a third contact sort rule associated with sorting the plurality of contact identifiers based on an association of one or more contacts, of the plurality of contacts, with an event, and
    a fourth contact sort rule associated with sorting the plurality of contact identifiers based on one or more contact sort rules associated with other devices;
    receiving, via the user interface and by the computing device, a first user input identifying a sort procedure,
    the sort procedure including:
    two or more contact sort rules of the plurality of contact sort rules, and
    the plurality of sort rules including:
    a first contact sort rule associated with sorting the plurality of contact identifiers based on locations associated with devices associated with the plurality of contacts,
    a second contact sort rule associated with sorting the plurality of contact identifiers based on a type of user activity preceding receipt of a request to display a sorted list of contact identifiers,
    a third contact sort rule associated with sorting the plurality of contact identifiers based on an association of one or more contacts, of the plurality of contacts, with an event, or
    a fourth contact sort rule associated with sorting the plurality of contact identifiers based on one or more contact sort rules associated with other devices, and
    an order for applying the two or more contact sort rules to the plurality of contact identifiers;
    retrieving, by the computing device, information that is associated with the plurality of contacts and that is applicable to the sort procedure;
    applying, by the computing device and based on the information that is associated with the plurality of contacts and that is applicable to the sort procedure, the two or more contact sort rules, in the order, to the plurality of contact identifiers to form the sorted list of contact identifiers;
    determining, by the computing device, that a particular contact identifier, of the plurality of contact identifiers, is associated with a time-dependent contact sort rule, of the plurality of contact sort rules;
    selectively including, by the computing device, the particular contact identifier within the sorted list of contact identifiers based on the time-dependent contact sort rule,
    the particular contact identifier being included in the sorted list of contact identifiers when a current time corresponds to a time associated with the time-dependent contact sort rule, and
    the particular contact identifier not being included in the sorted list of contact identifiers when the current time does not correspond to the time associated with the time-dependent contact sort rule;
    receiving, via the user interface of the computing device, a second user input to select one or more display options related to presenting the sorted list of contact identifiers; and
    presenting for display, via the user interface of the computing device, the sorted list of contact identifiers based on the one or more display options.

2. The method of claim 1, where receiving the first user input further includes:
    providing, for display via the user interface, respective sort rule identifiers associated with the plurality of contact sort rules; and
    receiving, via the user interface, a selection identifying two or more sort rule identifiers of the respective sort rule identifiers,
    the sort procedure being determined based on the selection identifying the two or more sort rule identifiers.

3. The method of claim 2, where each of the respective sort rule identifiers includes:
    a title for an associated one of the plurality of contact sort rules, and
    a description of the associated one of the plurality of contact sort rules.

4. The method of claim 2, where one sort rule identifier, of the two or more sort rule identifiers, is associated with at least two contact sort rules of the plurality of contact sort rules.

5. The method of claim 1, where the two or more contact sort rules includes the first contact sort rule associated with sorting the plurality of contact identifiers based on the locations associated with the devices associated with the plurality of contacts; and
    where applying the two or more contact sort rules includes:
        weighting the locations of the devices associated with the plurality of contacts based on determining whether the locations are within a particular radius of a location of the user.

6. The method of claim 1, where the plurality of contact sort rules are stored on a remote device, and
    where the method further includes:
        retrieving, based on receiving the first user input, the two or more contact sort rules from the remote device via a network.

7. The method of claim 6, where retrieving the two or more contact sort rules includes:
retrieving a plurality of contact sort rule identifiers from the remote device via the network;
providing, for display via the user interface, the plurality of contact sort rule identifiers;
receiving, via the user interface, a selection from the plurality of contact sort rule identifiers;
sending an indication of the selection to the remote device; and
receiving, from the remote device and based on sending the indication of the selection, data associated with the two or more contact sort rules.

8. The method of claim 1, where the computing device comprises:
a radiotelephone,
a personal communications system (PCS) terminal, or
a personal digital assistant (PDA).

9. The method of claim 1, where the two or more contact sort rules include the first contact sort rule, and
where applying the sort procedure includes:
determining the locations associated with the devices associated with the plurality of contacts,
determining a geographic location of the device when the request for the sorted list of contact identifiers is received,
determining, based on the locations associated with the devices associated with the plurality of contacts and the geographic location of the device, respective proximities of the respective devices associated with the plurality of contacts to the device, and
sorting the plurality of contact identifiers based on the respective proximities.

10. A device comprising:
a memory to store information associated with a plurality of contacts associated with a user associated with the device,
the information associated with the plurality of contacts including respective contact identifiers; and
a processor to:
provide, for display via a user interface, information associated with a list of sort rule identifiers corresponding to a plurality of contact sort rules,
the plurality of contact sort rules being associated with respective criteria for sorting the respective contact identifiers, and
the plurality of contact sort rules including:
a first contact sort rule associated with sorting the plurality of contact identifiers based on locations associated with devices associated with the plurality of contacts,
a second contact sort rule associated with sorting the plurality of contact identifiers based on a type of user activity preceding receiving a request to display a sorted contact list,
a third contact sort rule associated with sorting the plurality of contact identifiers based on an association of one or more contacts, of the plurality of contacts, with an event, and
a fourth contact sort rule associated with sorting the plurality of contact identifiers based on one or more contact sort rules associated with other devices,
receive, via the user interface, a first user input to identify a sort procedure for forming the sorted contact list from the respective contact identifiers,
the first user input identifying:
two or more contact sort rules, from the plurality of contact sort rules, to include in the sort procedure, and
an order for applying the two or more contact sort rules included in the sort procedure,
obtain, based on the first user input, a portion of the information associated with the plurality of contacts,
the portion being applicable to the sort procedure,
apply, based on the sort procedure, the two or more contact sort rules, in the order, to the portion of the information associated with the plurality of contacts to form the sorted contact list,
determine that a particular contact identifier, of the plurality of contact identifiers, is associated with a time-dependent contact sort rule of the plurality of contact sort rules,
selectively include the particular contact identifier within the sorted contact list based on the time-dependent contact sort rule,
the particular contact identifier being included in the sorted contact list when a current time corresponds to a time associated with the time-dependent contact sort rule, and
the particular contact identifier not being included in the sorted contact list when the current time does not correspond to the time associated with the time-dependent contact sort rule,
receive, via the user interface, a second user input identifying one or more display options related to presenting the sorted contact list, and
provide, for display via the user interface, the sorted contact list based on the one or more display options.

11. The device of claim 10, where the processor is further to:
retrieve respective sort rule identifiers associated with the plurality of contact sort rules,
provide, for display via the user interface, the respective sort rule identifiers,
receive, via the user interface, a user selection of one or more sort rule identifiers of the respective from the list of sort rule identifiers, and
determine the sort procedure based on the user selection of the one or more sort rule identifiers.

12. The device of claim 11, where each sort rule identifier included in the respective list of sort rule identifiers includes:
a title for an associated one of the plurality of contact sort rules, and
a description of the associated one of the plurality of contact sort rules.

13. The device of claim 10, where the two or more contact sort rules include the first contact sort rule, and
where, when applying the two or more contact sort rules, the processor is to:
weight the locations of the devices associated with the plurality of contacts based on a distance between the locations of the devices and a location of the user.

14. The device of claim 10, where the processor is further to:
retrieve the plurality of contact sort rules from a remote device.

15. The device of claim 10, where the two or more contact sort rules include the first contact sort rule, and
where the processor, when retrieving the information, is further to:
determine geographic locations of the devices associated with the plurality of contacts, and
determine the locations associated with the devices associated with the plurality of contacts based on the determined geographic locations of the devices.

16. The device of claim 10, where the processor is further to:
retrieve a plurality of contact sort rule identifiers from a remote device via a network,
present, for display via the user interface, the plurality of contact sort rule identifiers,
receive, via the user interface, a user selection of one or more contact sort rule identifiers of the plurality of contact sort rule identifiers, send, via the network, an indication of the user selection to the remote device, and receive, from the remote device, the sort procedure based on sending the indication of the user selection.

17. The device of claim 10, where the device comprises:
a radiotelephone,
a personal communications system (PCS) terminal, or
a personal digital assistant (PDA).

18. The device of claim 10, where the processor, when applying the two or more contact sort rules, is further to:
sort the respective contact identifiers further based on a time when the first user input is received.

19. A non-transitory memory device storing instructions, the instructions comprising:
one or more instructions that, when executed by a processor associated with a device, cause the processor to:
provide, for display via a user interface, a list of sort rule identifiers for sorting a contact list associated with a user of the device,
the list of sort rule identifiers corresponding to a plurality of sort rules associated with the device, and
the plurality of sort rules including:
a first contact sort rule associated with sorting the plurality of contact identifiers based on locations associated with devices associated with the plurality of contacts,
a second contact sort rule associated with sorting the plurality of contact identifiers based on a type of user activity preceding receiving a request to display a sorted list of contact identifiers,
a third contact sort rule associated with sorting the plurality of contact identifiers based on an association of one or more contacts, of the plurality of contacts, with an event, and
a fourth contact sort rule associated with sorting the plurality of contact identifiers based on one or more contact sort rules associated with other devices;
receive, via the user interface, a user selection of two or more sort rule identifiers from the list of sort rule identifiers,
the user selection identifying two or more sort rules of the plurality of sort rules;
receive information identifying an order for applying the two or more sort rules;
determine a sort procedure based on the user selection of the two or more sort rule identifiers and the information identifying the order for applying the two or more sort rules;
retrieve a plurality of contact identifiers included in the contact list;
retrieve information, associated with a plurality of contacts corresponding to the plurality of contact identifiers, that is applicable to the sort procedure;
apply, based on the retrieved information, the sort procedure to the plurality of contact identifiers to form the sorted list of contact identifiers;
determine that a particular contact identifier, of the plurality of contact identifiers, is associated with a time-dependent sort rule, of the plurality of sort rules;
selectively include the particular contact identifier within the sorted list of contact identifiers based on the time-dependent contact sort rule,
the particular contact identifier being included in the sorted list of contact identifiers when a time when the user selection of the two or more sort rule identifiers is received corresponds to a time associated with the time-dependent contact sort rule, and
the particular contact identifier not being included in the sorted list of contact identifiers when the time when the user selection of the two or more sort rule identifiers is received does not correspond to the time associated with the time-dependent contact sort rule;
receive, via the user interface, a user input identifying one or more display options related to presenting the sorted list of contact identifiers; and
provide, for display via the user interface, the sorted list of contact identifiers based on the one or more display options.

20. The non-transitory memory device of claim 19, where the instructions further comprise:
one or more instructions that, when executed by the processor, cause the processor to:
retrieve the list of sort rule identifiers from a remote server via a network; and
retrieve the two or more sort rules from the remote server via the network.

21. The non-transitory memory device of claim 19, where the one or more instructions to apply the sort procedure further include:
one or more instructions that, when executed by the processor, cause the processor to:
apply the sort procedure to the list of contact identifiers further based on the time when the user selection of the two or more sort rule identifiers is received.

* * * * *